US008020559B2

(12) United States Patent
Lacriox

(10) Patent No.: US 8,020,559 B2
(45) Date of Patent: Sep. 20, 2011

(54) DEVICE FOR THE ANGULAR POSITIONING OF A LIMB OF A PATIENT RESTING ON AN OPERATING TABLE

(76) Inventor: Alain Lacriox, Clamart (FR)

( * ) Notice: Subject to any disclaimer, the term of this patent is extended or adjusted under 35 U.S.C. 154(b) by 424 days.

(21) Appl. No.: 12/091,697

(22) PCT Filed: Sep. 21, 2006

(86) PCT No.: PCT/FR2006/002169
§ 371 (c)(1), (2), (4) Date: Apr. 25, 2008

(87) PCT Pub. No.: WO2007/048892
PCT Pub. Date: May 3, 2007

(65) Prior Publication Data

US 2008/0289636 A1 Nov. 27, 2008

(30) Foreign Application Priority Data

Oct. 25, 2005 (FR) ..................................... 05 10867

(51) Int. Cl.
*A61C 15/00* (2006.01)

(52) U.S. Cl. ....................................................... 128/845

(58) Field of Classification Search .................. 128/845, 128/846, 878, 882; 5/621, 623–624, 646–648
See application file for complete search history.

(56) References Cited

FOREIGN PATENT DOCUMENTS

| | | | |
|---|---|---|---|
| DE | 10304433 | A1 | 8/2004 |
| FR | 2605517 | A1 | 4/1988 |
| FR | 2631231 | A1 | 11/1989 |
| FR | 2732213 | A1 | 10/1996 |
| WO | 9734520 | A2 | 9/1997 |

*Primary Examiner* — Patricia M Bianco
*Assistant Examiner* — Camtu T Nguyen
(74) *Attorney, Agent, or Firm* — Browdy and Neimark, PLLC

(57) ABSTRACT

The invention relates to a device for angularly positioning a member of a patient lying on an operating table (TO), comprising means for positioning a cradle (Be) supporting the member of the patient relative to lateral guide rails ($RG_1$, $RG_2$) of the operating table (TO). Said positioning means comprise: means ($MS_1$, $MS_2$, $MS_3$) for fixing the cradle positioning means (Be) on either of the two lateral guide rails ($RG_1$, $RG_2$) of the operating table (TO), and; means for positioning this cradle (Be) along an axis ($?_3$) contained in a plane parallel to that defined by the operating table (TO), and perpendicular to the principal axis (Δ) of the operating table (TO).

18 Claims, 13 Drawing Sheets

DEVICE FOR THE ANGULAR POSITIONING OF A LIMB OF A PATIENT RESTING ON AN OPERATING TABLE

BACKGROUND OF THE INVENTION

1. Field of the invention

The present invention concerns a device for the angular positioning of a limb of a patient resting on an operating table or a treatment table.

It applies in particular, but not exclusively, to the positioning of a leg of a patient during a knee operation.

2. Description of the prior art

In general terms, it is known that, in order to perform such positioning, there has already been proposed a support device involving a cylinder whereof the rod supports a spindle that extends transversely to the cylinder rod and carries a cradle intended to support the leg of the patient. This arrangement of the various members causes the occurrence of a large lateral torque formed by the weight of the supported leg and the length of the spindle carrying the cradle. This torque, being applied in full to the head of the cylinder and its rod, quickly leads to deterioration and malfunctioning thereof. Moreover, through its position, this type of bar hinders the surgeon in the accomplishment of his actions and makes difficult the possible concomitant use of devices that could prove useful.

There has also been proposed an appliance comprising a cradle-support bar attached to the end of a crank coupled to the rod of a cylinder by means of an articulation so that the translational movement of the cylinder rod creates a rotational movement of the cradle-support bar. This solution is not satisfactory given that the appliance described is mounted on a lateral edge of the operating table and that consequently the pelvis of the patient has a tendency to tilt causing a movement of the knee which does not take place in a vertical plane parallel to the longitudinal axis of the operating table. This results in inaccuracy on the verticality of the leg and on the surgical operation on the knee.

There has furthermore been proposed a device for adjusting the angular position of a limb of a patient resting on an operating table comprising:

- a shelf provided on two opposite lateral edges with means of fixing with adjustable spacing onto the two lateral guide rails of an operating table; and
- a trough support mounted by one of its ends on a rotary transverse shaft carried by the shelf and driven rotationally by a drive mechanism by means of a link enabling a translational movement of the trough support whilst allowing its rotational driving by said shaft.

This solution is not satisfactory given that the pelvis of the patient has a tendency to tilt causing a movement of the knee which does not take place in a vertical plane parallel to the longitudinal axis of the operating table.

OBJECT OF THE INVENTION

A more particular aim of the invention is to eliminate these drawbacks by means of an appliance capable of being mounted on the majority of operating tables used at the present time and which adapts to the morphology of patients, by taking into account in particular the position of the hip joint; this appliance also makes it possible to obtain better accuracy in carrying out surgical operations.

SUMMARY OF THE INVENTION

To that ends the appliance according to the invention comprises means of positioning a cradle supporting the limb of the patient with respect to the lateral guide rails of an operating table or treatment table, knowing that said positioning means comprise:

- means of securing said means of positioning the cradle equally well on one or the other of the two lateral guide rails of the operating table;
- means of positioning said cradle according to an axis contained in a plane parallel to that defined by the operating table, and perpendicular to the longitudinal axis of the operating table;

which above-mentioned means of positioning said cradle comprise:

- a base plate situated in a plane parallel to that defined by the operating table, which base plate being capable of moving parallel to itself in sliding connection with the above-mentioned securing means;
- a bracket, secured to the above-mentioned base plate, comprising a rotation shaft, situated close to the upper part of said bracket, and whereof the axis is situated in a plane parallel to said base plate and perpendicular to the longitudinal axis of the operating table;
- an arm support, mounted able to rotate about said rotation shaft and driven rotationally in a plane perpendicular to said base plate by a drive mechanism, disposed essentially parallel to the plane defined by the operating table;
- a guide slot, mounted secured to the above-mentioned arm support, on the side opposite to the above-mentioned drive mechanism, and capable of guiding a sliding block in a plane perpendicular to said base plate;
- an arm, secured to the above-mentioned sliding block, whereof the main axis is parallel to the longitudinal axis of the operating table;
- a hub, whereof the axis is situated in a plane parallel to said base plate and perpendicular to the longitudinal axis of the operating table, and capable of sliding through said arm according to the main axis of said arm;
- a shaft, mounted able to rotate and move translationally in the above-mentioned hub, whereof the axis is collinear with the above-mentioned axis of the hub, and supporting at one of its ends the above-mentioned cradle.

By virtue of these provisions:

- the device, according to the invention, can be mounted on operating or treatment tables of variable width and thickness, equally well on one or the other of the two lateral guide rails of said operating or treatment table;
- the shaft supporting the cradle has its axis perpendicular to the longitudinal axis of the operating table, which axis of said shaft is perpendicular to the vertical plane passing through the leg of the patient;
- the axis of tilt of the assembly consisting of the above-mentioned arm support, the above-mentioned arm, the above-mentioned hub and the above-mentioned shaft associated with the cradle can be brought to the vicinity of the hip joint so that the force applied by the cradle is distributed uniformly over the thigh, avoiding any excessive compression of the organs (muscles, tendons, veins, arteries) of the thigh as well as any transverse tilting of the pelvis;
- the adjustable length of the cradle is provided so as to avoid any force under the knee of the patient in the region of the femoro-tibial joint and compression of the popliteal artery; advantageously, the cradle can consist of a fixed jaw secured to the shaft supporting the cradle and a sliding movable jaw, making it possible to adjust the distance between the two jaws according to the morphology of the thigh.

Advantageously, the above-mentioned drive mechanism making it possible to rotationally drive the above-mentioned arm support can be disposed essentially perpendicular to the plane defined by the operating table, so as to allow the surgeon easier access to the patient.

Advantageously, the above-mentioned rotation shaft, situated close to the upper part of said bracket, allowing the arm support to pivot, can comprise a bore, in order to be able to house a laser beam generator, small in size and of low power, or any other light beam generator, in order to allow the surgeon accurate visual positioning of the axis of the above-mentioned rotation shaft with respect to the coxo-femoral joint in the case of a knee operation.

Advantageously, the above-mentioned means of securing said cradle-positioning means equally well on one or the other of the two lateral guide rails of the operating table can consist of an essentially vertical shaft secured to the base plate of the appliance according to the invention, capable of sliding translationally and capable of pivoting rotationally with respect to a hub secured to one of the two lateral rails, so as to allow the surgeon to better position the limb to be treated of the patient.

Advantageously, the above-mentioned arm comprising the above-mentioned sliding block guided by the above-mentioned guide slot secured to the arm support can be driven translationally by means of a bolt/nut assembly, so as to allow the surgeon to accurately position the arm with respect to the arm support.

Advantageously, the cross-section of the above-mentioned sliding block of the above-mentioned arm can be similar in shape to an omega and with a shape matching the cross-section of the above-mentioned guide slot secured to the arm support, in order to enable an angular deviation either side of a median position of the arm with respect to the arm support according to the axis of symmetry of the omega-shaped cross-section, so as to allow the surgeon to better position the limb to be treated of the patient.

Advantageously, the above-mentioned arm might not have a hub capable of sliding through said arm according to its main axis; thus the shaft supporting the cradle will be mounted able to rotate and move translationally at the end of the arm; several arms of different length can be envisaged, so as to avoid the surgeon being hindered by the end of the adjustable arm in the case where it is necessary to position the shaft supporting the cradle close to the arm support.

Advantageously, an asepsis cover making it possible to entirely cover the device according to the invention can be provided during the surgical operation; this cover can be disposable after each operation or can be reusable after sterilisation.

BRIEF DESCRIPTION OF THE DRAWINGS

An embodiment will be described hereinafter, by way of a non-limiting example, with reference to the accompanying drawings in which.

DESCRIPTION OF THE PREFERRED EMBODIMENTS

Figure 1:
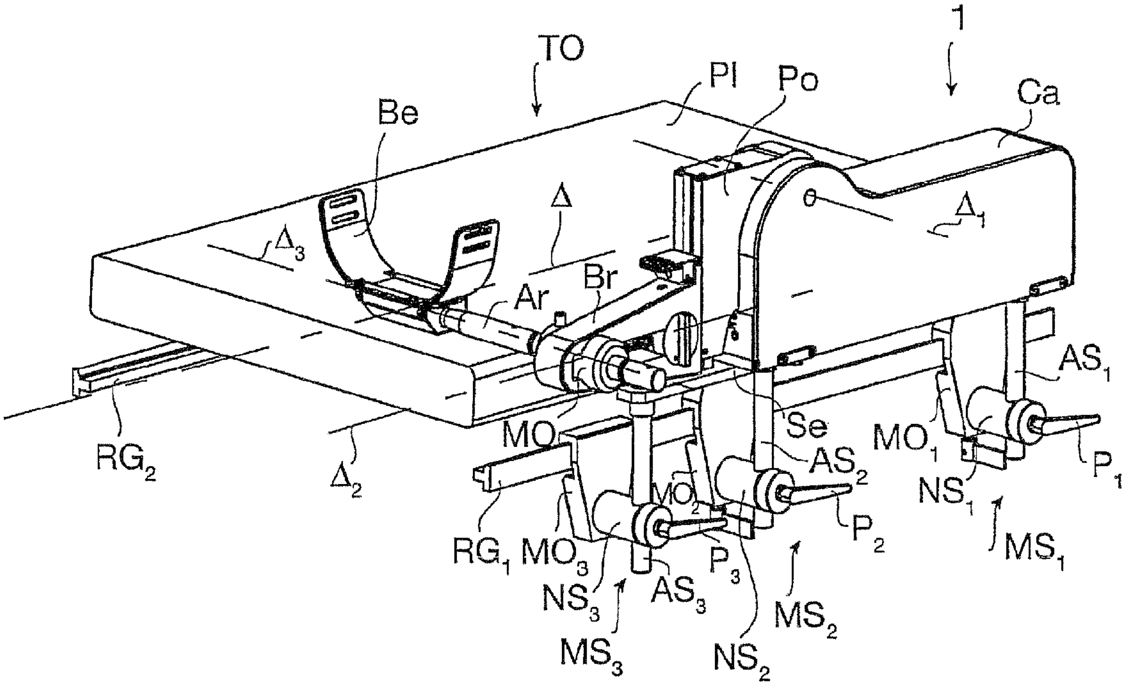
FIG. 1 is a depiction in perspective of the device for adjusting the position of a limb of a patient resting on an operating table.
Figure 2:
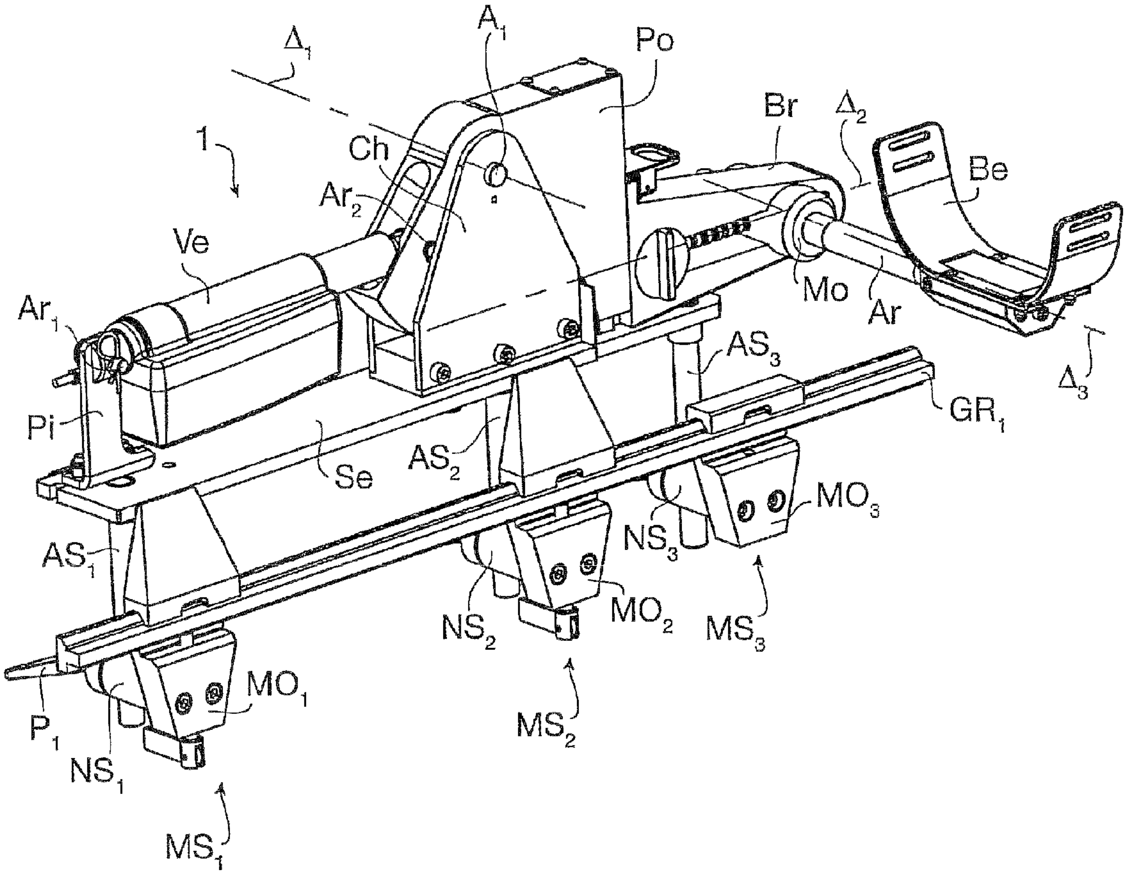
FIG. 2 is a second depiction in perspective of said device seen from another angle associated with a single rail of the operating table.
Figure 3:
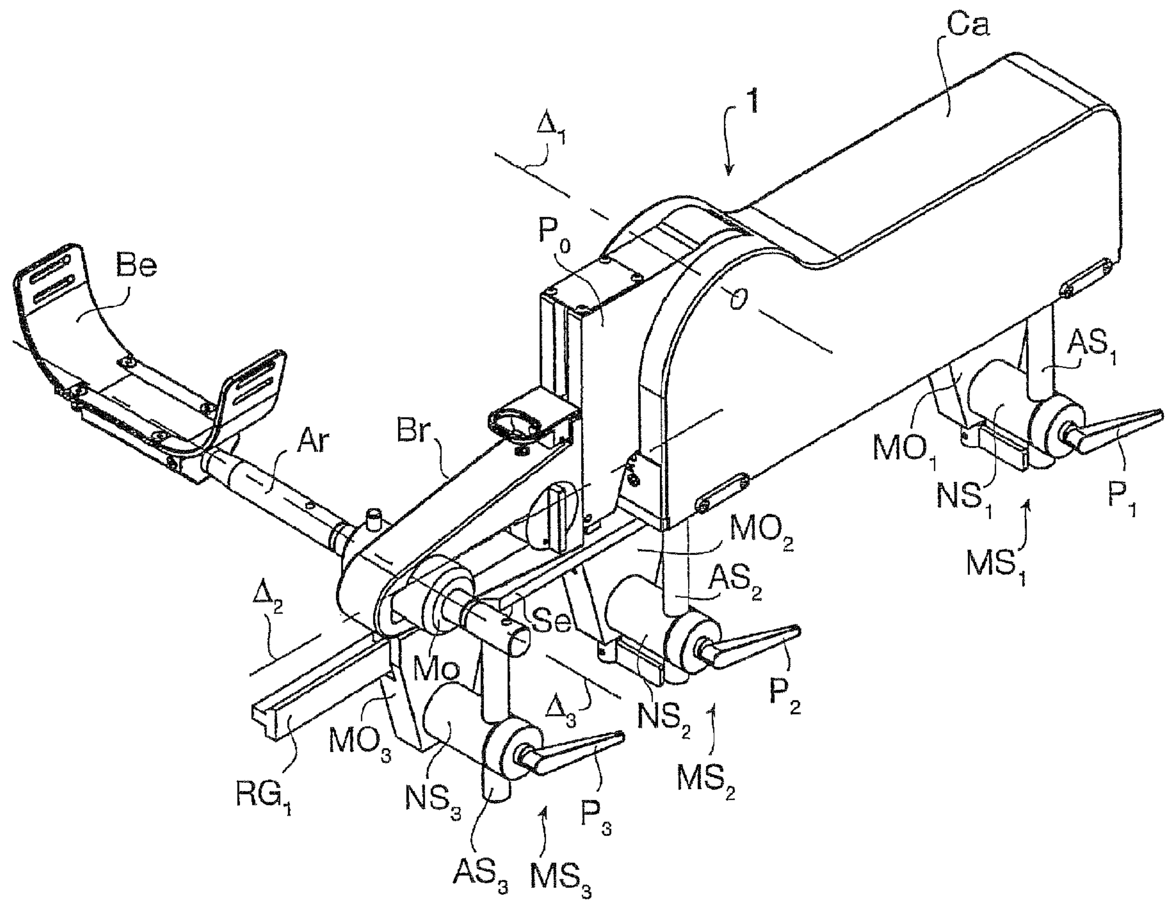
FIG. 3 is a third depiction in perspective of said device seen from another angle associated with a single rail of the operating table.

In the example depicted in FIGS. 1, 2 and 3, the device 1, comprising means of positioning a cradle Be supporting the limb of a patient with respect to the lateral guide rails $RG_1$, $RG_2$ of an operating table TO, consists of:

- a base plate Se disposed horizontally and laterally along the operating table TO whereof the longitudinal axis is Δ, represented by a platform P1 and its two lateral guide rails $RG_1$, $RG_2$;
- means $MS_1$, $MS_2$, $MS_3$ of securing said base plate Se to one or other of the two guide rails $RG_1$, $RG_2$ of the operating table TO;
- a bracket Ch, secured to said base plate Se, whereof the cross-section is U-shaped;
- a rotation shaft $A_1$, situated close to the upper part of the bracket Ch, and whereof the axis $\Delta_1$ is situated in a plane parallel to the base plate Se and perpendicular to the longitudinal axis A of the operating table TO;
- an arm support Po, mounted able to rotate about the rotation shaft $A_1$ and driven rotationally in the vertical plane perpendicular to the base plate Se, by a cylinder Ve;
- a guide slot, mounted secured to the above-mentioned arm support Po, on the side opposite to the cylinder Ve, and capable of guiding a sliding block Co in a plane perpendicular to the base plate Se;
- an arm Br, secured to the sliding block Co, whereof the main axis $\Delta_2$ is parallel to the longitudinal axis A of the operating table TO;
- a hub Mo, whereof the main axis $\Delta_3$ is situated in a plane parallel to the base plate Se and perpendicular to the axis A of the operating table TO, and capable of sliding through the arm Br according to the main axis $\Delta_2$ of the arm Br;

a shaft Ar, mounted able to rotate and move translationally in the hub Mo, whereof the axis is collinear with the axis $\Delta_3$ of the hub Mo, and supporting at one of its ends the cradle Be supporting the limb of the patient.

Thus, under these conditions, the cradle Be can be positioned above the operating table TO, accurately with respect to the leg of the patient, taking their morphology into account; it can tilt in a plane perpendicular to the plane defined by the operating table TO passing through the leg of the patient and according to an axis Δ1 brought to the vicinity of the hip joint.

The means $MS_1$, $MS_2$, $MS_3$ of securing the base plate Se to one or other of the two guide rails $RG_1$, $RG_2$ of the operating table TO consist of at least two shafts $AS_1$, $AS_2$, $AS_3$ secured to the base plate Se on the face opposite to that supporting the means of positioning the cradle Be, oriented perpendicular to the base plate Se, which shafts $AS_1$, $AS_2$, $AS_3$ can each slide in a clamping spindle $NS_1$, $NS_2$, $NS_3$ whereof the main axis is horizontal and perpendicular to the longitudinal axis Δ of the operating table TO; each of said spindles $NS_1$, $NS_2$, $NS_3$ is secured to a pair of jaws $Mo_1$, $Mo_2$, $Mo_3$ whereof the clamping end has a shape matching the cross-section of the guide rails $RG_1$, $RG_2$ of the operating table TO, the pair of jaws $Mo_1$, $Mo_2$, $Mo_3$ consisting of a fixed upper jaw secured to the clamping spindle $NS_1$, $NS_2$, $NS_3$, and a movable lower jaw that can be actuated by a clamping handle $P_1$, $P_2$, $P_3$, the fixed upper jaw bearing on the section, oriented towards the operating table TO, of the base plate Se.

Thus the base plate Se can be moved and positioned vertically and accurately, being guided on the one hand by the shafts $AS_1$, $AS_2$, $AS_3$, and bearing, in the vicinity of its section oriented towards the operating table TO, on the vertical face of the fixed jaws.

Generally, operating or treatment tables consist of a plurality of table segments, secured to one another and capable of being oriented with respect to one another according to the nature of the operation to be performed on the patient; consequently, the guide rails, associated with said table elements, are also segmented and thus have interruptions, referred to as rail breaks, sometimes requiring clamping on two of the three securing means depending on said rail break.

The drive mechanism Ve, of actuator type, rotationally drives the arm support Po by means of a first articulation $Ar_1$ in conjunction with a foot Pi secured to the base plate Se and a second articulation $Ar_2$ secured to the arm support Po, which second articulation $Ar_2$ is disposed between the shaft $A_1$ and the lower part of the arm support Po, making it possible to raise or lower, to a greater or lesser degree, the sliding block Co and consequently the arm Br comprising the hub Mo, the shaft Ar and the cradle Be.

Generally, the cradle Be is raised so that the leg of the patient is situated in a vertical plane, thus making it possible to position the femoro-tibial joint satisfactorily.

Furthermore, the cradle Be being able to be positioned either on one side of the operating table TO, or on the other side, thus makes it possible to carry out surgical operations on the left knee or the right knee.

Naturally, a protective housing Ca can be used so as to avoid any contact of the motorised mechanism with the operating table TO and/or with any whatsoever of its accessories.

Thus, the space around the cradle Be is totally freed and makes it possible to dispose the appliances intended for the surgical operation according to the constraints defined by said operation.

The drive mechanism Ve can be of the type with an electric, pneumatic or hydraulic actuator; the control thereof can be performed close to the operating table TO or remotely controlled; the angular positioning of the arm support Po, and consequently of the cradle Be, can be performed by means of mechanical limit stops, position sensors, or any other mechanism for angular positioning or automatic position control, according to the morphological parameters of the patient.

Figure 4:
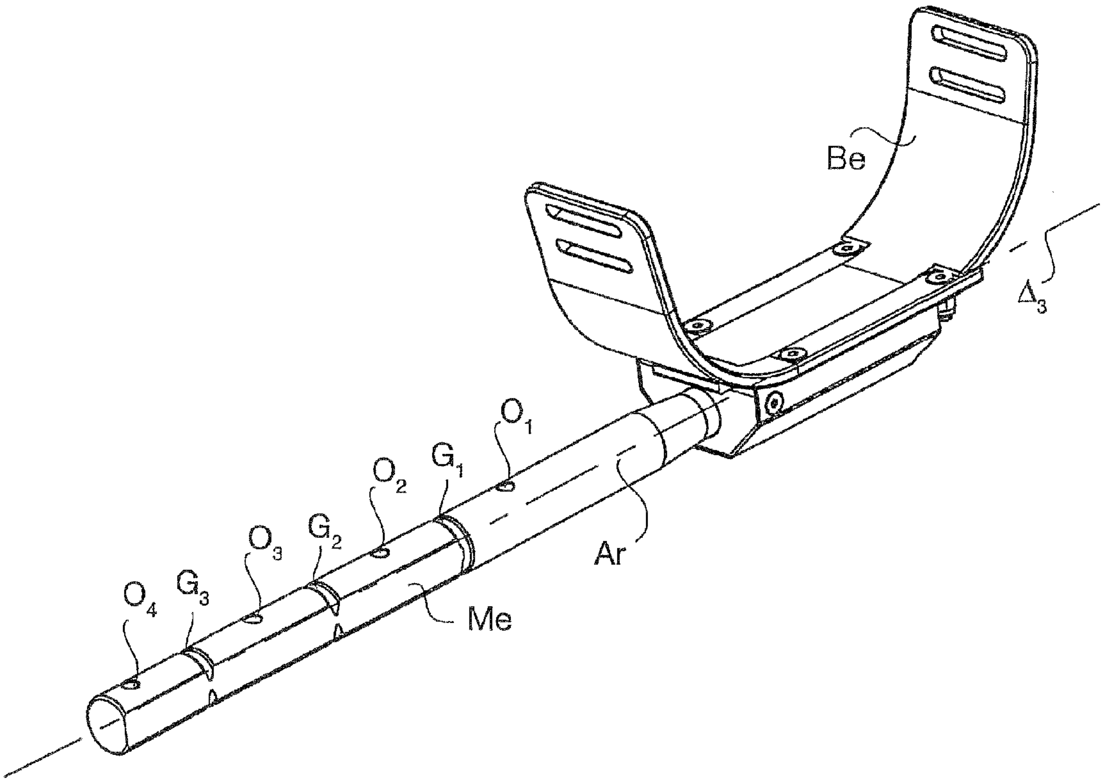
FIG. 4 is a depiction in perspective of the cradle associated with its shaft mounted able to rotate and move translationally in the above-mentioned hub.

In the example depicted in FIG. 4, the shaft Ar associated with the cradle Be comprises a flat surface Me with a length close to half the length of the shaft Ar and a plurality of equidistant circular slots $G_1$, $G_2$, $G_3$ separated by circular apertures $O_1$, $O_2$, $O_3$, $O_4$ passing through the shaft Ar and whereof the axes are perpendicular to the axis $\Delta_3$ of the shaft Ar.

It should be noted that the depth of the plurality of equidistant slots $G_1$, $G_2$, $G_3$ is less than the depth of the flat surface Me.

A first cylindrical pin, not depicted, passes through the aperture in the hub Mo receiving the shaft Ar, whereof a generator is tangential to the flat surface Me of the shaft Ar.

Consequently, the shaft Ar can be moved manually according to its main axis $\Delta_3$ when the flat surface Me is parallel to said first cylindrical pin, and can pivot manually about its main axis $\Delta_3$ when a slot of said plurality of slots $G_1$, $G_2$, $G_3$ is opposite said first cylindrical pin.

Thus, for a rotation of approximately 90 degrees of the shaft Ar in one direction, followed by a translational movement of the shaft Ar and then a rotation of the same magnitude in the direction opposite to the previous one, the distance between the cradle Be and the hub Mo is adjustable in amounts equivalent to the distance between successive slots $G_1$, $G_2$, $G_3$.

Immobilisation of the shaft Ar rotation-wise and translation-wise is performed by means of a second pin Go, passing diametrically through the hub Mo and fitting into the circular apertures $O_1$, $O_2$, $O_3$, $O_4$ passing through the shaft Ar and whereof the axes are perpendicular to the axis $\Delta_3$ of the shaft Ar. This second pin Go is depicted in FIG. 5.

Figure 5:
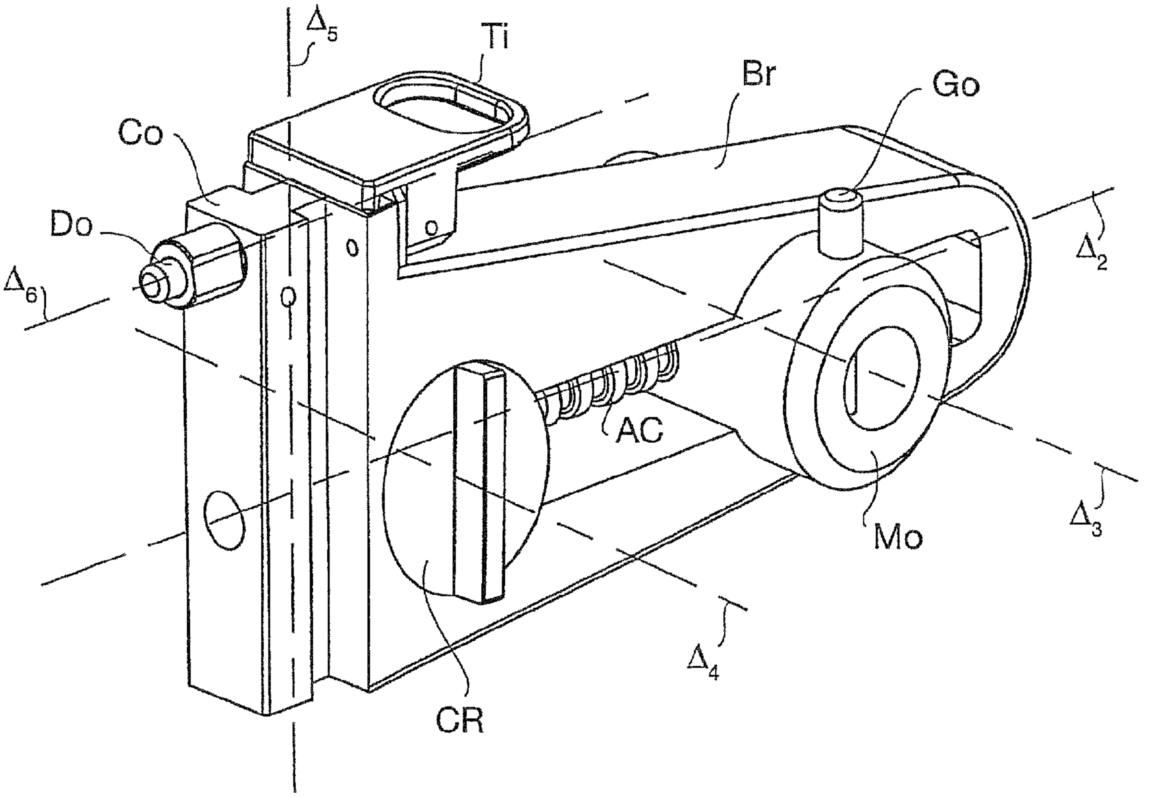
FIG. 5 is a depiction in perspective of the arm, secured to said sliding block and comprising the above-mentioned hub capable of sliding through said arm according to the main axis of said arm.

In the example depicted in FIG. 5, the hub Mo, in a longitudinal section containing its main axis $A_2$, is an H-shaped structure; the arm Br has a width that is constant and slightly less than the length of the horizontal post separating the two vertical posts of the H-shaped structure, and has a hole situated in a plane perpendicular to the axis $A_3$ of the hub Mo, thus allowing the hub Mo to slide according to the main axis $A_2$ of the arm Br, the width of the hole being slightly greater than the thickness of the horizontal post of the H-shaped structure.

Consequently, the hub Mo is guided translation-wise and immobilised rotation-wise in the hole in the arm Br.

The above-mentioned second pin Go passes diametrically through the hub Mo in one of the two vertical posts of the H-shaped structure, making it possible to enter the circular apertures $O_1$, $O_2$, $O_3$, $O_4$ passing through the shaft Ar and thus to secure it with respect to the hub Mo.

A shaft AC, having a plurality of grooves, whereof the main axis is collinear with the main axis $\Delta_2$ of the arm Br, is secured to the hub Mo, in the vicinity of one of its ends. A claw coupling CR, partially depicted, whereof the axis of rotation $\Delta_4$ is perpendicular to the axis $\Delta_2$ of the grooved shaft AC, makes it possible to lock translation-wise the grooved shaft AC and consequently the hub Mo, by means of a rotation of said claw coupling CR allowing a tooth to come to fit with a matching shape in one of the plurality of grooves.

Thus, the movement of the hub Mo and consequently that of the cradle Be is adjustable in amounts equivalent to the distance between two successive grooves.

Advantageously, the claw coupling CR makes it possible, by means of a second orientation of said claw coupling CR, to release the grooved shaft AC, associated with the hub Mo, thus allowing a free movement of the assembly consisting of the hub Mo, the shaft Ar and the cradle Be, according to the main axis $\Delta_2$ of the arm Br.

Furthermore, the arm Br comprises, in the vicinity of its end opposite to that where the previously described hub Mo is situated, the sliding block Co according to an axis $\Delta_5$ orthogonal to the axes respectively $\Delta_3$ and $\Delta_2$ of the hub Mo and of the grooved shaft AC, and whereof the cross-section is H-shaped.

In the vicinity of the external face of the arm support Po, opposite the arm Br, a guide slot, whereof the cross-section is T-shaped, with a shape matching the sliding block Co of the arm Br, makes it possible to guide the arm Br according to a direction orthogonal to the axes respectively $\Delta_3$ and $\Delta_2$ of the hub Mo and of the grooved shaft AC.

A pull handle Ti actuating a finger Do whereof the axis $\Delta_6$ is parallel to the axis $\Delta_2$ of the grooved shaft AC makes it possible, by engaging the finger Do in an aperture Ox of the plurality of apertures made in the arm support Po, to position the arm Br with respect to the arm support Po.

Figure 6:
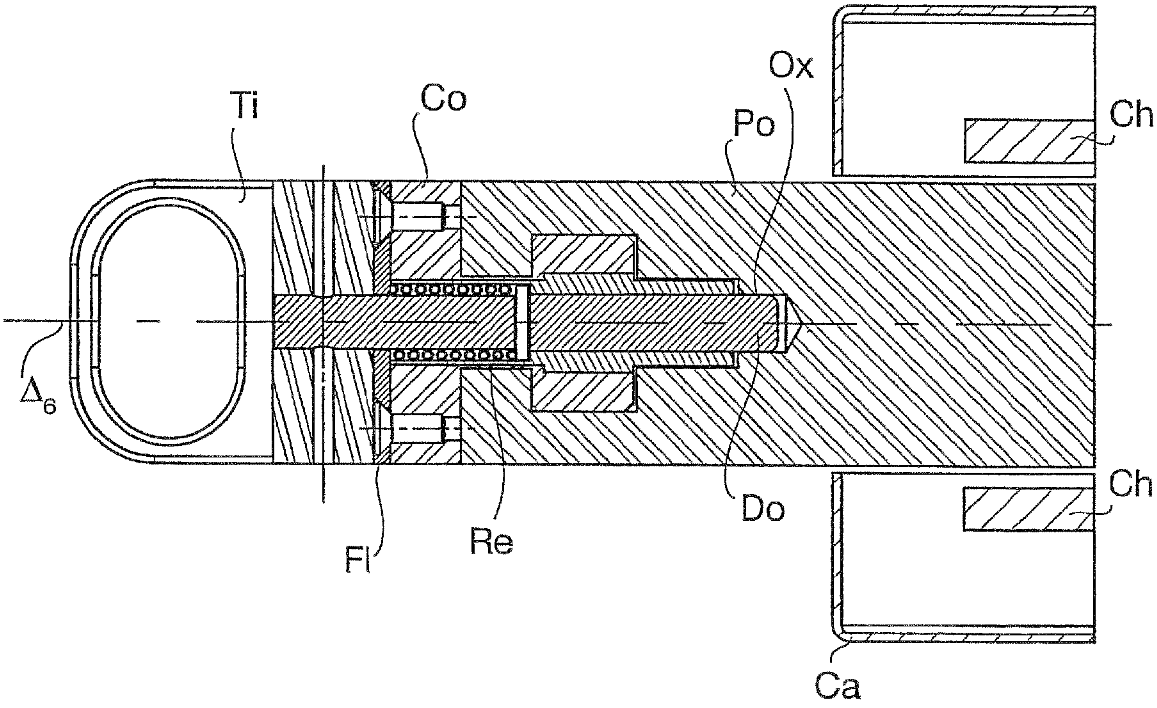
FIG. 6 is a depiction in section of said sliding block and of a mechanism for positioning said arm with respect to said arm support.

In the example depicted in FIG. 6, the depiction in section of the sliding block Co and the mechanism for positioning the arm Br with respect to said sliding block Co shows the H-shaped cross-section of the sliding block Co associated with the arm Br and the T-shaped cross-section of the guide slot situated in the arm support Po.

According to the axis $\Delta_6$, the finger Do passes through the sliding block Co of the arm Br and the guide slot of the arm support Po, in order to end up in the vicinity of one of its ends in an aperture Ox of the plurality of apertures made in the arm support Po.

In the vicinity of its other end, the finger Do is secured to the pull handle Ti positioned in a plane perpendicular to the sliding block Co of the arm Br.

A spring Re, mounted in compression, bearing on the one hand on a collar situated in the vicinity of the middle of the finger Do and on the other hand on a plate F1 closing off the external face of the sliding block Co of the arm Br, allows the assembly, consisting of the finger Do and the pull handle Ti, to keep the finger Do at the far end of the chosen aperture Ox.

Figure 7:
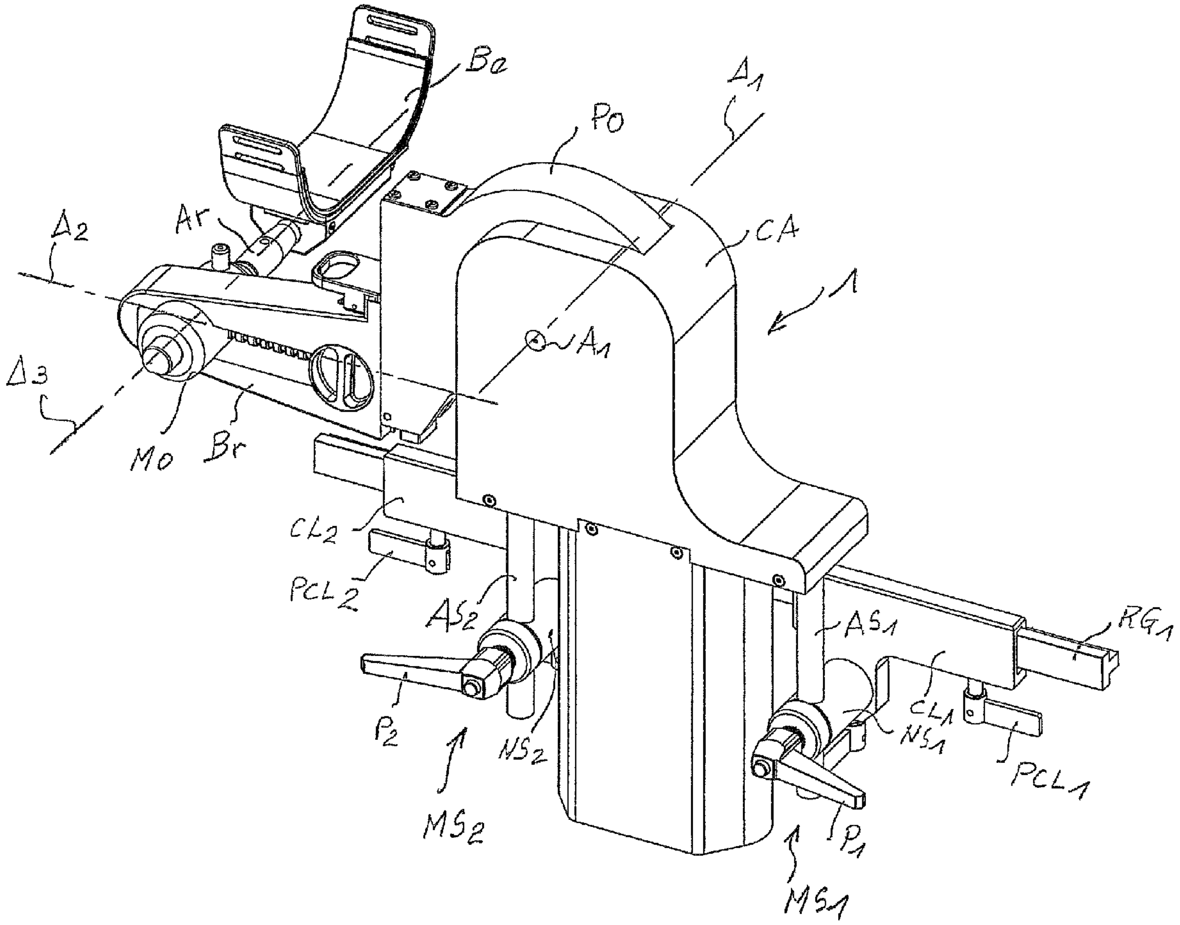
FIG. 7 is a depiction in perspective of the device for adjusting the position of a limb of a patient according to a second embodiment.
Figure 8:
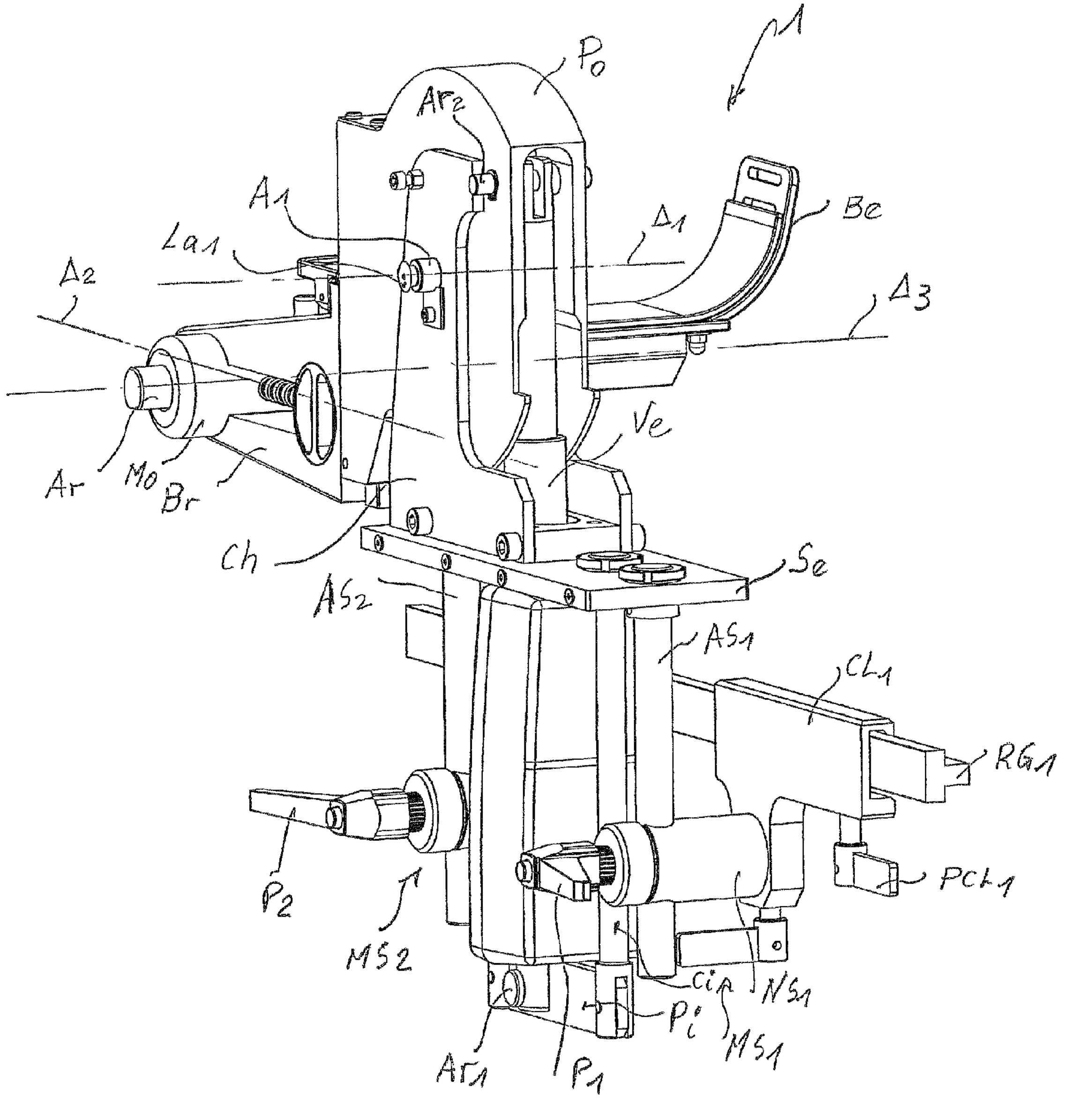
FIG. 8 is a second depiction in perspective of the device for adjusting the position of a limb of a patient according to the second embodiment.

In the example depicted in FIGS. 7 and 8, the device 1 according to a second embodiment, comprising means of positioning a cradle Be supporting the limb of a patient with respect to the lateral guide rail $RG_1$ of an operating table, not depicted, consists of:

- a base plate Se disposed horizontally and laterally along the lateral guide rail $RG_1$;
- means $MS_1$, $MS_2$ of securing said base plate Se to the guide rail $RG_1$;
- a bracket Ch, secured to said base plate Se, whereof the cross-section is U-shaped;
- a rotation shaft $A_1$, situated close to the upper part of the bracket Ch, and whereof the axis $\Delta_1$ is situated in a plane parallel to the base plate Se and perpendicular to the guide rail $RG_1$;
- an arm support Po, mounted able to rotate about the rotation shaft $A_1$ and driven rotationally in the vertical plane perpendicular to the base plate Se, by a cylinder Ve;
- a guide slot, mounted secured to the above-mentioned arm support Po, on the side opposite to the cylinder Ve, and capable of guiding a sliding block Co in a plane perpendicular to the base plate Se;
- an arm Br, secured to the sliding block Co, whereof the main axis $\Delta_2$ is parallel to the guide rail $RG_1$;
- a hub Mo, whereof the main axis $\Delta_3$ is situated in a plane parallel to the base plate Se and perpendicular to the guide rail $RG_1$, and capable of sliding through the arm Br according to the main axis $\Delta_2$ of the arm Br;
- a shaft Ar, mounted able to rotate and move translationally in the hub Mo, whereof the axis is collinear with the axis $\Delta_3$ of the hub Mo, and supporting at one of its ends the cradle Be supporting the limb of the patient.

Furthermore, unlike the first embodiment of the device according to the invention, the above-mentioned cylinder Ve, making it possible to rotationally drive the above-mentioned arm support Po mounted able to rotate about the rotation shaft $A_1$, is essentially disposed perpendicular to the plane defined by the operating table, thus freeing the space situated symmetrically to the cradle Be supported by the arm Br and the arm support Po.

Thus, under these conditions, the cradle Be can be positioned above the operating table, accurately with respect to the leg of the patient, taking their morphology into account; it can tilt in a plane perpendicular to the plane defined by the operating table passing through the leg of the patient and according to an axis Δ1 brought to the vicinity of the hip joint.

Furthermore, the space freed by the cylinder Ve makes it possible to generate a more comfortable space intended for the patient.

The means $MS_1$, $MS_2$ of securing the base plate Se to the guide rail $RG_1$ consist of two shafts $AS_1$, $AS_2$ secured to the base plate Se on the face opposite to that supporting the means of positioning the cradle Be, oriented perpendicular to the base plate Se, which shafts $AS_1$, $AS_2$ can each slide in a clamping spindle $NS_1$, $NS_2$ whereof the main axis is horizontal and perpendicular to the longitudinal axis of the guide rail $RG_1$; each of said spindles $NS_1$, $NS_2$ is secured to a cramp, respectively $CL_1$, $CL_2$, whereof the clamping is performed with a shape matching the cross-section of the guide rail $RG_1$, the cramps $CL_1$, $CL_2$ being secured by a clamping handle, respectively $PCL_1$, $PCL_2$.

Thus the base plate Se can be moved and positioned vertically and accurately, being guided by the shafts $AS_1$, $AS_2$.

The drive mechanism Ve, of actuator type, rotationally drives the arm support Po by means of a first articulation $Ar_1$ in conjunction with a foot Pi secured to the base plate Se by means of two columns Ci, and a second articulation $Ar_2$ secured to the arm support Po, which second articulation $Ar_2$ is disposed between the shaft $A_1$ and the upper part of the arm support Po, making it possible to raise or lower, to a greater or lesser degree, the sliding block Co and consequently the arm Br comprising the hub Mo, the shaft Ar and the cradle Be.

As described previously according to the first embodiment of the device according to the invention, the drive mechanism Ve can be of the electric, pneumatic or hydraulic actuator type; furthermore, a protective housing Ca can be used so as to avoid any contact of the motorised mechanism with the operating table.

In the example depicted in FIG. 8, the above-mentioned rotation shaft $A_1$, situated close to the upper part of said bracket Ch, allowing the arm support Po to pivot, can comprise a bore, in order to be able to house a laser beam generator $La_1$, $LA_2$, small in size and of low power, in order to allow the surgeon accurate visual positioning of the axis of the above-mentioned rotation shaft with respect to the joint of the limb of the patient.

Said joint of the limb of the patient can be previously either marked, or estimated, or felt; in the case of a knee operation, it will be a question of determining the position of the coxofemoral joint.

The laser generator beams can be controlled separately or simultaneously; protection against the risk of dazzling by the laser beam will be provided to that end.

Figure 9:
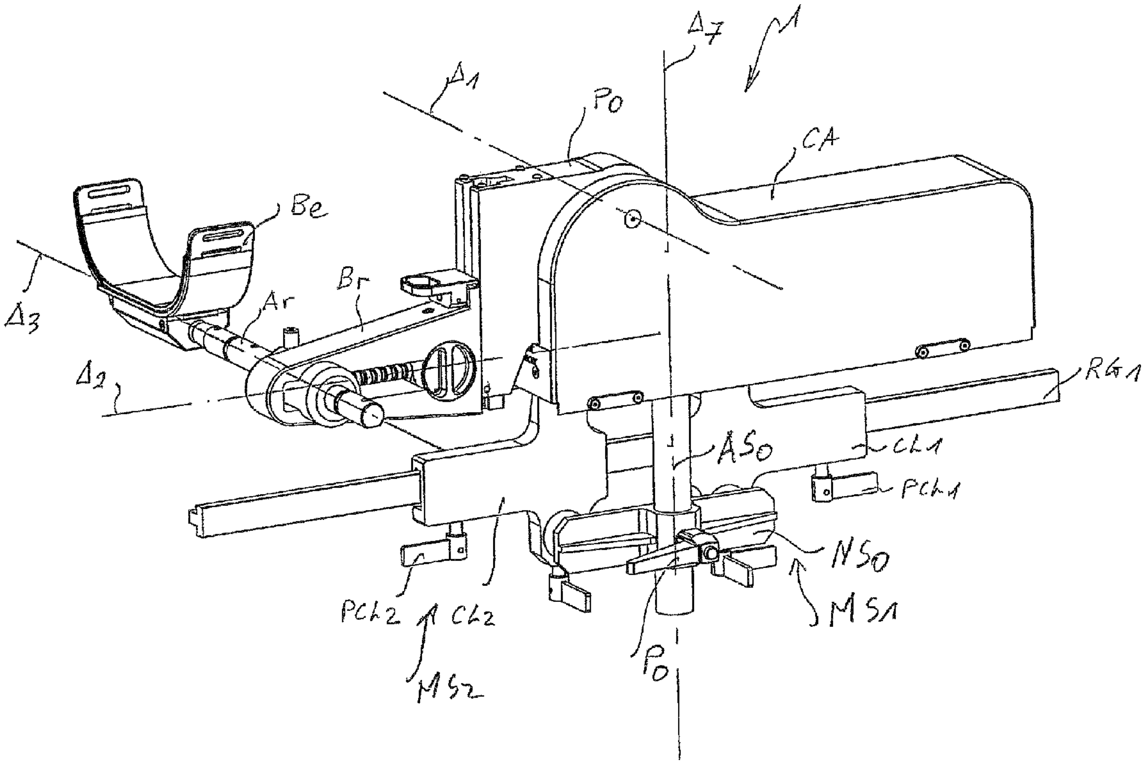
FIG. 9 is a depiction in perspective of the device for adjusting the position of a limb of a patient according to a third embodiment.

In the example depicted in FIG. 9, the device 1 according to a third embodiment, comprising means of positioning a cradle Be supporting the limb of a patient with respect to the lateral guide rail $RG_1$ of an operating table, not depicted, consists, apart from the means described previously, of:

means $MS_1$, $MS_2$ of securing said base plate Se to the guide rail $RG_1$.

Unlike the first embodiment of the device according to the invention, the above-mentioned means $MS_1$, $MS_2$ of securing the base plate Se to the guide rail $RG_1$ consist of a shaft $AS_0$, secured to the base plate Se on the face opposite to that supporting the means of positioning the cradle Be, oriented perpendicular to the base plate Se, which shaft $AS_0$ can slide in a clamping spindle $NS_0$, whereof the main axis is horizontal and perpendicular to the longitudinal axis of the guide rail $RG_1$; the clamping of the above-mentioned shaft $AS_0$ in the spindle $NS_0$ is performed by means of a clamping handle $P_0$; said spindle $NS_0$ is secured to two cramps $CL_1$, $CL_2$ whereof the clamping is performed with a shape matching the cross-section of the guide rail $RG_1$, the cramps $CL_1$, $CL_2$ being secured by means of a clamping handle, respectively $PCL_1$, $PCL_2$.

Thus the base plate Se can slide translationally and can pivot rotationally with respect to a hub secured to one of the two lateral rails, so as to allow the surgeon to better position the limb to be treated of the patient.

Figure 10:
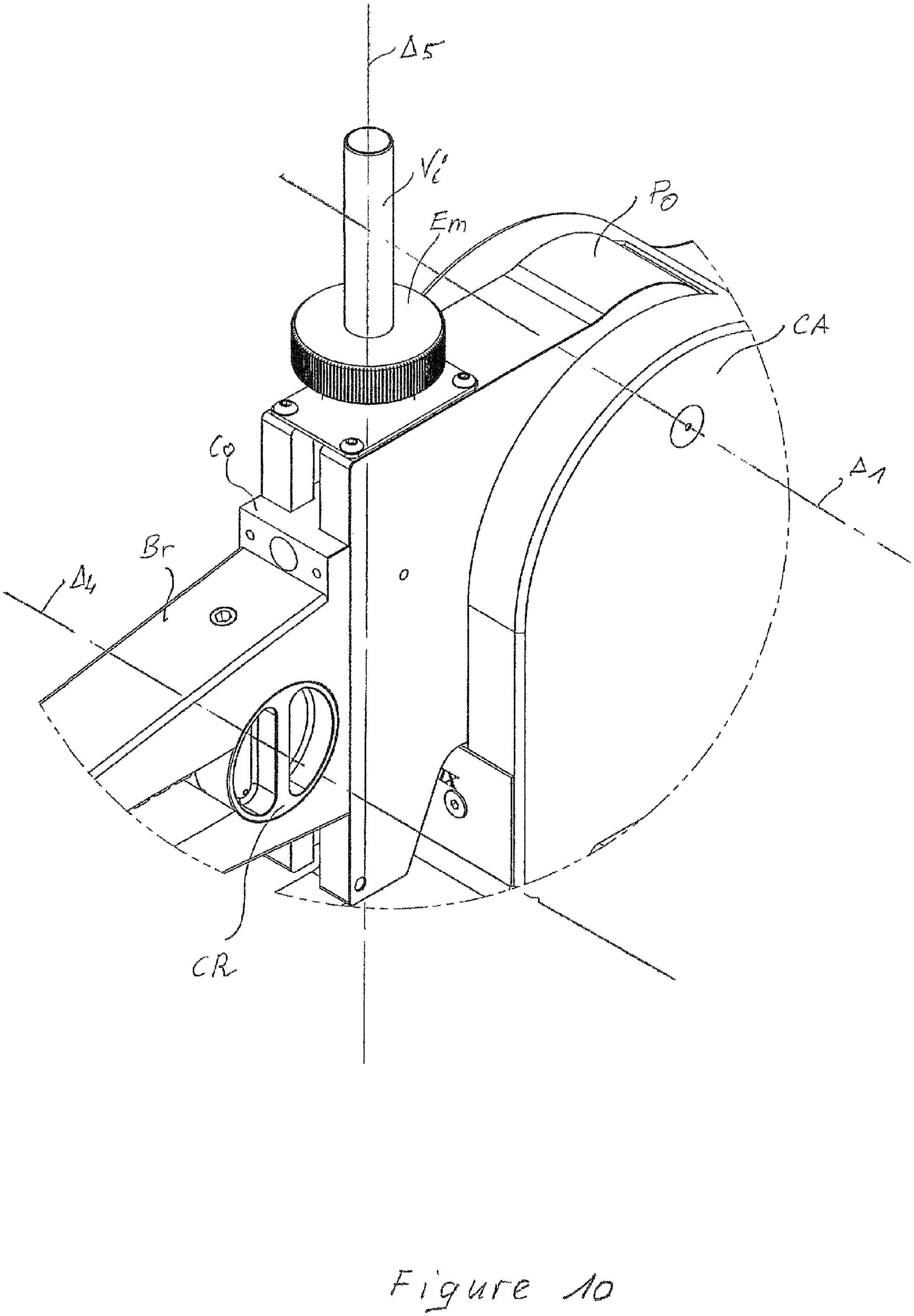
FIG. 10 is a depiction in perspective detailing the adjustment of the positioning of the arm with respect to the arm support.

In the example depicted in FIG. 10, the arm Br comprises the sliding block Co guided by the guide slot secured to the arm support Po; the translational movement of the arm Br, according to the axis $\Delta_5$, is performed by means of a bolt Vi/nut Em assembly, so as to allow the surgeon to accurately position the arm Br with respect to the arm support Po.

Two solutions can be envisaged:

- either the above-mentioned bolt Vi is secured to the above-mentioned sliding block Co and the knurled nut Em is free to turn resting on the upper face of the arm support Po, the driving of the above-mentioned knurled nut Em driving the arm Br in one direction or in the opposite direction depending on the direction of rotation of said nut Em;
- or the above-mentioned bolt Vi is secured to the knurled nut Em, which bolt Ve drives the sliding block Co through a threaded hole, the driving of the above-mentioned knurled nut Em driving the arm Br in one direction or in the opposite direction depending on the direction of rotation of said nut Em.

Figure 11:
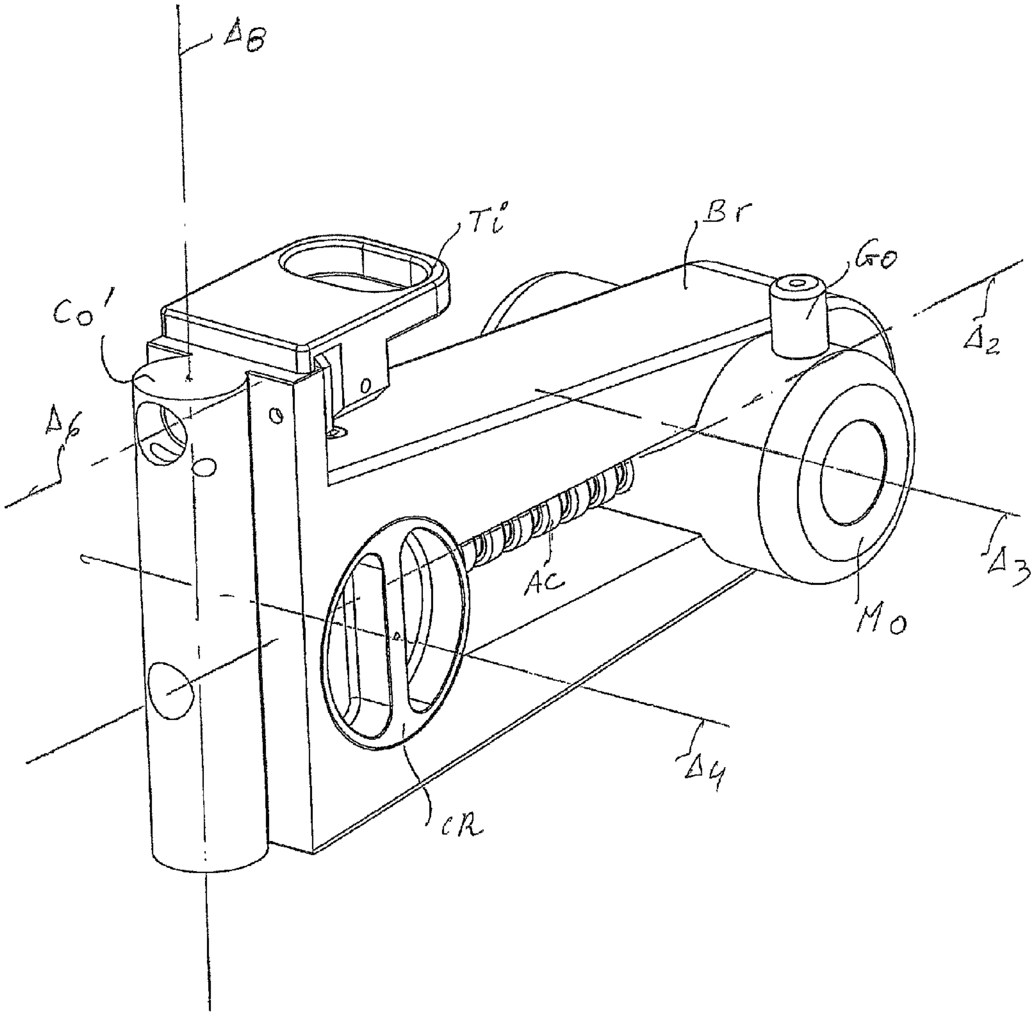
FIG. 11 is a depiction in perspective of the arm secured to a sliding block according to a second embodiment.

In the example depicted in FIG. 11, the cross-section of the above-mentioned sliding block Co' of the above-mentioned arm Br is similar in shape to an omega and with a shape matching the cross-section of the above-mentioned guide slot secured to the arm support Po, in order to enable an angular deviation either side of a median position of the arm with respect to the arm support about an axis $\Delta_8$ of symmetry of the omega-shaped cross-section, so as to allow the surgeon to better position the limb to be treated of the patient.

The above-mentioned guide slot secured to the arm support Po comprises a clamping element, not depicted, making it possible to lock the above-mentioned sliding block Co' and thus position the arm Br with respect to the arm support Po, according to the chosen angle of deviation.

Figure 12:
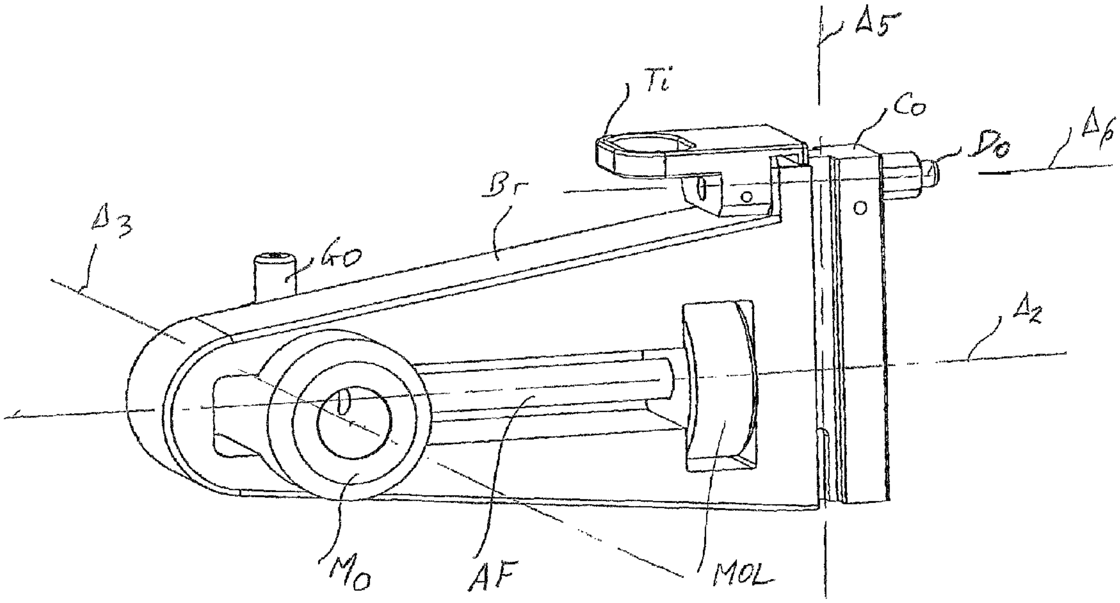
FIG. 12 is a depiction in perspective of the arm secured to a sliding block according to a third embodiment.

In the example depicted in FIG. 12, the hub Mo, in a longitudinal section containing its main axis $\Delta_2$, is an H-shaped structure; the arm Br has a width that is constant and slightly less than the length of the horizontal post separating the two vertical posts of the H-shaped structure, and has a hole situated in a plane perpendicular to the axis $\Delta_3$ of the hub Mo, thus allowing the hub Mo to slide according to the main axis $\Delta_2$ of the arm Br, the width of the hole being slightly greater than the thickness of the horizontal post of the H-shaped structure.

Consequently, the hub Mo is guided translation-wise and immobilised rotation-wise in the hole in the arm Br.

The above-mentioned second pin Go passes diametrically through the hub Mo in one of the two vertical posts of the H-shaped structure, making it possible to enter the circular apertures $O_1$, $O_2$, $O_3$, $O_4$ passing through the shaft Ar and thus secure it with respect to the hub Mo.

A threaded shaft AF, whereof the main axis is collinear with the main axis $\Delta_2$ of the arm Br, is secured to the hub Mo, in the vicinity of one of its ends. A knurled wheel MOL, whereof the bore is threaded, with a shape matching the above-mentioned threaded shaft A-F, is housed in a recess situated at the end opposite to the above-mentioned hub Mo; this recess allows said knurled wheel MOL to pivot according to the axis $\Delta_2$, and be immobilised translation-wise according to the same axis $\Delta_2$. Thus, the movement of the hub Mo and consequently that of the cradle Be is adjustable by means of the rotation of the knurled wheel MOL, according to its direction of rotation.

Furthermore, the arm Br comprises, in the vicinity of its end opposite to that where the previously described hub Mo is situated, the sliding block Co according to an axis $\Delta_5$ orthogonal to the axes respectively $\Delta_3$ and $\Delta_2$ of the hub Mo and of the threaded shaft AF, and whereof the cross-section is H-shaped.

In the vicinity of the external face of the arm support Po, opposite the arm Br, a guide slot, whereof the cross-section is T-shaped, with a shape matching the sliding block Co of the arm Br, makes it possible to guide the arm Br according to a direction orthogonal to the axes respectively $\Delta_3$ and $\Delta_2$ of the hub Mo and of the threaded shaft AF.

A pull handle Ti actuating a finger Do whereof the axis $\Delta_6$ is parallel to the axis $\Delta_2$ of the threaded shaft AF, makes it possible, by engaging the finger Do in an aperture Ox of the plurality of apertures made in the arm support Po, to position the arm Br with respect to the arm support Po.

Figure 13:
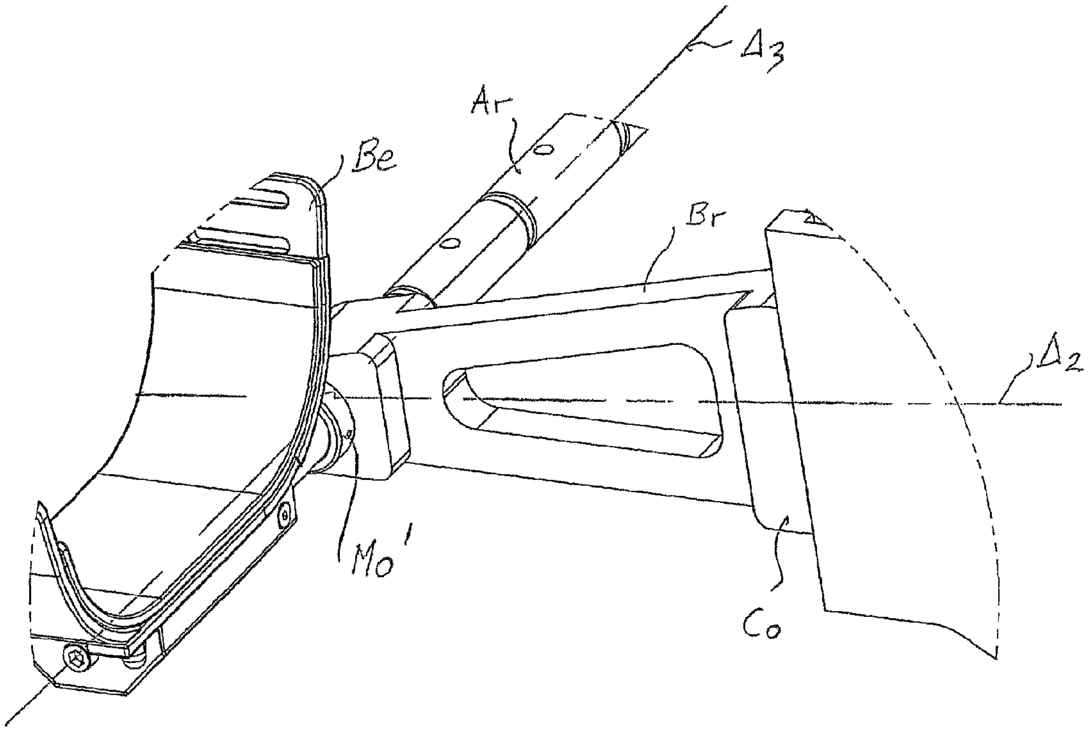
FIG. 13 is a depiction in perspective of the arm and partially of the shaft supporting the cradle and of the cradle, according to a fourth embodiment.

In the example depicted in FIG. 13, the above-mentioned arm Br comprises a hub Mo' situated at the opposite end of said arm Br to the above-mentioned sliding block Co; said hub Mo' therefore does not slide through said arm Br according to its main axis $\Delta_2$; thus the shaft Ar supporting the cradle Be is mounted able to rotate and move translationally at the end of the arm Br, according to the axis $\Delta_3$; several arms of different length can be envisaged, so as to avoid the surgeon being hindered by the end of the adjustable arm in the case where it is necessary to position the shaft Ar supporting the cradle Be close to the arm support Po.

Thus the different degrees of freedom that characterise the device 1 according to the invention, namely:

- the possibility of positioning the device 1 to the right or to the left of the operating table TO;
- the adjustment distance-wise of the device 1 with respect to the operating table TO;
- the orientation of the arm support Po and of the arm Br supporting the cradle Be in a plane perpendicular to the operating table TO;
- the height of the arm Br with respect to the axis of rotation $\Delta_1$ of the arm support Po;
- the distance of the shaft Ar supporting the cradle Be with respect to the axis of rotation $\Delta_1$ of the arm support Po;
- the distance of the cradle Be with respect to the arm Br;

make it possible to:

- position the cradle Be above the operating table TO, accurately with respect to the leg of the patient, taking their morphology into account;

tilt the cradle Be in a plane perpendicular to the plane defined by the operating table TO passing through the leg of the patient and according to an axis $\Delta_1$ brought to the vicinity of the hip joint.

Naturally, the device 1 according to the invention will make it possible to position the upper limb of a patient, within the context of surgical operations performed on the forearm, elbow, arm and wrist. Similarly, it will make it possible, for example, to position the nape of the neck of a patient within the context of surgical operations performed on the cervical vertebrae.

The invention claimed is:

1. Device for the angular positioning of a limb of a patient resting on an operating table having a longitudinal axis, comprising means of positioning a cradle supporting the limb of the patient with respect to the lateral guide rails of the operating table, wherein said means of positioning comprise:

means of securing said means of positioning the cradle as well on one or the other of the two lateral guide rails of the operating table;

means of positioning said cradle according to an axis contained in a plane parallel to a plane defined by the operating table, and perpendicular to the longitudinal axis of the operating table;

said means of positioning said cradle further comprising:

a base plate situated in a plane parallel to that defined by the operating table, which base plate being capable of moving parallel to itself in sliding connection with the above-mentioned means of securing;

a bracket, secured to the above-mentioned base plate, comprising a rotation shaft, situated close to the upper part of said bracket, and whereof the rotation shaft has an axis situated in a plane parallel to said base plate, perpendicular to the longitudinal axis of the operating table, and parallel to the plane defined by the operating table;

an arm support, mounted to and rotatable about said rotation shaft and driven rotationally in a plane perpendicular to said base plate by a drive mechanism;

a guide slot, mounted secured to the above-mentioned arm support, on the side opposite to the above-mentioned drive mechanism, and capable of guiding a sliding block in a plane perpendicular to said base plate;

an arm, secured to said sliding block, having an axis parallel to the longitudinal axis of the operating table;

a hub, whereof the axis is situated in a plane parallel to said base plate and perpendicular to the longitudinal axis of the operating table, and capable of sliding through said arm according to the main axis of said arm;

a shaft, mounted to and rotatable about the above-mentioned hub and move translationally in the above-mentioned hub, whereof the axis is collinear with the above-mentioned axis of the hub, and supporting at one of its ends the above-mentioned cradle, wherein the shaft supporting the cradle is able to tilt the cradle in a plane perpendicular to the plane defined by the operating table.

2. Device according to claim 1, wherein the above-mentioned means of securing comprise:

at least two shafts secured to the base plate each capable of sliding in a clamping spindle;

at least two pairs of jaws whereof the clamping end has a shape matching the cross-section of the guide rails of the operating table, each of said pairs of jaws consisting of a fixed upper jaw secured to the clamping spindle, and a movable lower jaw that can be actuated by a clamping handle, the fixed upper jaw bearing on the section, oriented towards the operating table, of the base plate.

3. Device according to claim 1, wherein the above-mentioned drive mechanism, of actuator type, rotationally drives the arm support by means of a first articulation in conjunction with a foot secured to the base plate and a second articulation secured to the arm support, which second articulation is disposed between the shaft and the lower part of the arm support.

4. Device according to claim 1, which further comprises a protective housing located so as to prevent any contact of the above-mentioned drive mechanism from the operating table and/or with any whatsoever of its accessories.

5. Device according to claim 1, wherein the above-mentioned shaft associated with the cradle comprises a flat surface with a length close to half the length of the shaft and a plurality of equidistant circular slots, the depth of the plurality of slots being less than the depth of the flat surface; a cylindrical pin passes through the aperture in the hub receiving the shaft, whereof a generator is tangential to the flat surface of the shaft.

6. Device according to claim 1, wherein the above-mentioned hub, in a longitudinal section containing its main axis, is an H-shaped structure, the arm having a width that is constant and slightly less than the length of the horizontal post separating the two vertical posts of the H-shaped structure, and has a hole situated in a plane perpendicular to the axis of the hub, allowing the hub to slide according to the main axis of the arm, the width of the hole being slightly greater than the thickness of the horizontal post of the H-shaped structure.

7. Device according to claim 1, wherein the above-mentioned arm comprises:

a shaft, having a plurality of grooves, whereof the main axis is collinear with the main axis of the arm, which shaft is secured to the hub, in the vicinity of one of its ends;

a claw coupling, whereof the axis of rotation is perpendicular to the axis of the grooved shaft, making it possible to lock or unlock translation-wise the grooved shaft and the hub, by means respectively of a first rotation of said claw coupling allowing a tooth to come to fit with a matching shape in one of the plurality of grooves, or of a second rotation of said claw coupling allowing the above-mentioned tooth to escape from said plurality of grooves.

8. Device according to claim 1, wherein the above-mentioned cradle comprises a fixed jaw secured to the shaft supporting the cradle and a sliding movable jaw, making it possible to adjust the distance between the two jaws according to the morphology of the thigh.

9. Device according to claim 1, wherein the above-mentioned arm comprises several different lengths.

10. Device according to claim 1, wherein the above-mentioned rotation shaft, situated close to the upper part of the above-mentioned bracket, allowing the arm support to pivot, comprises a blind bore at each of its ends, in order to be able to house a laser beam generator, small in size and of low power.

11. Device according to claim 1, wherein the above-mentioned means of securing the base plate to the guide rail of said means of positioning the cradle consist of a shaft secured to said base plate on the face opposite to that supporting the above-mentioned means of positioning the cradle, oriented perpendicular to said base plate, which shaft slides in a clamping spindle, whereof the main axis is horizontal and perpendicular to the longitudinal axis of said guide rail.

12. Device according to claim 11, wherein the clamping of the above-mentioned shaft in the above-mentioned spindle is performed by means of a clamping handle, said spindle is secured to two cramps whereof the clamping is performed with a shape matching the cross-section of the guide rail, the above-mentioned cramps being secured by means of a clamping handle, respectively.

13. Device according to claim 1, wherein the above-mentioned sliding block guided by the guide slot secured to the arm support comprises a bolt/nut assembly, allowing the translational movement of the arm according to an axis orthogonal to the above-mentioned axes respectively, of the above-mentioned hub and the above-mentioned arm.

14. Device according to claim 1, wherein the above-mentioned sliding block guided by the guide slot secured to the arm support comprises an omega-shaped cross-section and with a shape matching the cross-section of the above-mentioned guide slot secured to the arm support, in order to enable an angular deviation either side of a median position of the arm with respect to the arm support about an axis of symmetry of said omega-shaped cross-section.

15. Device according to claim 1, wherein the above-mentioned arm comprises:

a threaded shaft, whereof the main axis is collinear with the main axis of the arm, which threaded shaft is secured to the hub, in the vicinity of one of its ends;

a knurled wheel, whereof the bore is threaded, with a shape matching the above-mentioned threaded shaft, which knurled wheel is housed in a recess situated at the end opposite to the above-mentioned hub, the above-mentioned recess allowing said knurled wheel to pivot according to the axis, and be immobilised translation-wise according to the same axis, the rotation of the above-mentioned knurled wheel allowing the movement of the hub and consequently that of the cradle.

16. Device for the angular positioning of a limb of a patient resting on an operating table, comprising means of positioning a cradle supporting the limb of the patient with respect to the lateral guide rails of the operating table, wherein said means of positioning comprises:

securing means of securing said means of positioning the cradle equally well on one or the other of the two lateral guide rails of the operating table;

means of positioning said cradle according to an axis contained in a plane parallel to that defined by the operating table, and perpendicular to a main axis of the operating table;

said means of positioning said cradle further comprising:

a base plate situated in a plane parallel to that defined by the operating table, which base plate being capable of moving parallel to itself in sliding connection with the means of securing;

a bracket, secured to the base plate, comprising a rotation shaft, situated close to the upper part of said bracket, and whereof the rotation shaft has an axis situated in a plane parallel to said base plate and perpendicular to the longitudinal axis of the operating table;

an arm support, mounted to and rotatable about said rotation shaft and driven rotationally in a plane perpendicular to said base plate by a drive mechanism;

a guide slot, mounted secured to the arm support, on the side opposite to the above-mentioned drive mechanism, and capable of guiding a sliding block in a plane perpendicular to said base plate;

an arm, secured to said sliding block, having an axis parallel to the main axis of the operating table;

a hub, whereof the axis is situated in a plane parallel to said base plate and perpendicular to the main axis of the operating table, and capable of sliding through said arm according to the main axis of said arm;

a shaft, mounted to and rotatable about the above-mentioned hub and move translationally in the above-mentioned hub, whereof the axis is collinear with the above-mentioned axis of the hub, and wherein said shaft supports the cradle at one of its ends, and wherein the above-mentioned drive mechanism is of the type with an electric, pneumatic or hydraulic actuator; the control thereof is performed close to the operating table or remotely controlled.

17. Device according to claim 16, wherein the above-mentioned drive mechanism, making it possible to rotationally drive the above-mentioned arm support mounted able to rotate about the rotation shaft, is disposed perpendicular to the plane defined by the operating table.

18. Device for the angular positioning of a limb of a patient resting on an operating table, comprising means of positioning a cradle supporting the limb of the patient with respect to the lateral guide rails of the operating table, wherein said means of positioning comprise:

means of securing said means of positioning the cradle equally well on one or the other of the two lateral guide rails of the operating table;

means of positioning said cradle according to an axis contained in a plane parallel to that defined by the operating table, and perpendicular to the main axis of the operating table;

said means of positioning said cradle further comprising:

a base plate situated in a plane parallel to that defined by the operating table, which base plate being capable of moving parallel to itself in sliding connection with the above-mentioned means of securing;

a bracket, secured to the above-mentioned base plate, comprising a rotation shaft, situated close to the upper part of said bracket, and whereof the axis is situated in a plane parallel to said base plate perpendicular to the longitudinal axis of the operating table, and parallel to the plane defined by the operating table;

an arm support, mounted to and rotatable about said rotation shaft and driven rotationally in a plane perpendicular to said base plate by a drive mechanism;

a guide slot, mounted secured to the above-mentioned arm support, on the side opposite to the above-mentioned drive mechanism, and capable of guiding a sliding block in a plane perpendicular to said base plate;

an arm, secured to said sliding block, having an axis parallel to the axis of the operating table; said arm comprises a hub situated at the opposite end of said arm to the sliding block, the above-mentioned hub is secured to said arm;

a shaft, mounted to and rotatable about the above-mentioned hub and move translationally at the end of the arm according to an axis collinear with the above-mentioned axis of the hub, and supporting at one of its ends the above-mentioned cradle, wherein the shaft supporting the cradle is able to tilt the cradle in a plane perpendicular to the plane defined by the operating table.

* * * * *

UNITED STATES PATENT AND TRADEMARK OFFICE

CERTIFICATE OF CORRECTION

PATENT NO. : 8,020,559 B2
APPLICATION NO. : 12/091697
DATED : September 20, 2011
INVENTOR(S) : Lacroix It is certified that error appears in the above-identified patent and that said Letters Patent is hereby corrected as shown below:

On title page at Item (12) and at Item (75) Inventor, delete “Lacriox” and insert --Lacroix--.

Signed and Sealed this
Sixth Day of March, 2012

David J. Kappos

*Director of the United States Patent and Trademark Office*